United States Patent [19]

Desor et al.

[11] Patent Number: 5,448,303
[45] Date of Patent: Sep. 5, 1995

[54] APPARATUS INCLUDING AMPLITUDE LIMITER AND ASSOCIATED METHOD FOR GENERATING A MODIFIED VIDEO SIGNAL

[75] Inventors: Hans-Juergen Desor, Denzlingen; Heinrich Koehne, Voerstetten, both of Germany

[73] Assignee: Deutsche ITT Industries, GmbH, Freiburg, Germany

[21] Appl. No.: 148,799

[22] Filed: Nov. 8, 1993

[30] Foreign Application Priority Data

Nov. 24, 1992 [DE] Germany ............... 42 39 396.5

[51] Int. Cl.[6] .................................. H04N 5/213
[52] U.S. Cl. .................................. 348/618; 348/622
[58] Field of Search ................ 348/618–623, 348/607; H04N 5/213

[56] References Cited

U.S. PATENT DOCUMENTS

| | | |
|---|---|---|
| 4,270,026 | 5/1981 | Shenoi et al. |
| 4,302,631 | 11/1981 | Shenoi et al. |
| 4,523,236 | 6/1985 | Carlson et al. ............ 348/623 |
| 4,538,236 | 8/1985 | Dischert et al. ............ 348/618 X |
| 4,573,075 | 2/1986 | Bolger. |
| 4,684,989 | 8/1987 | Roeder ............ 348/622 |
| 4,698,696 | 10/1987 | Matsuo ............ 348/622 |
| 4,709,269 | 11/1987 | Ozaki ............ 348/662 |
| 4,748,498 | 5/1988 | Yamanishi et al. ............ 348/622 |
| 4,926,361 | 5/1990 | Ohtsubo et al. ............ 348/607 X |
| 4,928,166 | 5/1990 | Akiyama ............ 348/622 |
| 4,962,434 | 10/1990 | Matsuo ............ 348/622 X |
| 5,289,283 | 2/1994 | Hopper et al. ............ 348/607 |

FOREIGN PATENT DOCUMENTS 3423112 1/1985 Germany.
3919817 12/1990 Germany.

OTHER PUBLICATIONS

Fernseh–Und Kino–Technik Vogt Jul. 1989 Zweidmensionale Digitale Aperturentzerrung Fur HDTV Kameras, Vogt, C, "*Fernseh–Und Kino–Technik*" 1989, No. 7, pp. 356–362; German Periodical.

*Primary Examiner*—Victor R. Kostak
*Attorney, Agent, or Firm*—Plevy & Associates

[57] ABSTRACT

An apparatus and method for generating a modified video signal consisting of a correction signal and a video input signal. The correction signal is derived from a digitized video input signal by at least a frequency-band limiter and an amplitude limiter. The video input signal is delayed by the processing time of the correction signal before the two signals are combined. To avoid unwanted harmonics the amplitude limiter uses a transfer function which can be exactly described by a rational integral function of the nth degree, $$y = a_0 + a_1 {}^* x + a_2 {}^* x^2 + a_3 {}^* x^3 \ldots a_n {}^* x^n$$

with $1 < n < f_n/f_s$, where $f_n$ is the Nyquist frequency, $f_s$ is the maximum frequency of the frequency-band-limited video signal, x is the input to the amplitude limiter $a_0$ to $a_n$ are scale factors, and y is the output of the amplitude limiter.

27 Claims, 3 Drawing Sheets

APPARATUS INCLUDING AMPLITUDE LIMITER AND ASSOCIATED METHOD FOR GENERATING A MODIFIED VIDEO SIGNAL

FIELD OF THE INVENTION

The present invention relates to a method of generating a modified video signal consisting of a correction signal and a video input signal, said correction signal being derived from a digitized video input signal.

BACKGROUND OF THE INVENTION

Methods of modifying a video signal are used to correct the frequency response and/or improve the image definition of a screen display. Video-signal changes with small or medium amplitude are to be emphasized by the correction signal to accentuate fine image details. Large amplitude changes of the video signal, however, are not to be emphasized or steepened, since this would result in an unnatural three-dimensional effect, and also the resulting large amplitude of the modified video signal may cause defocusing in the case of fine details known as blooming.

Methods of modifying video signals are known in the prior art, U.S. Pat. No. 4,573,075 entitled DIGITAL SIGNAL CORING APPARATUS WITH CONTROLLABLE CORING THRESHOLD LEVEL, and issued to Bolger, describes a digital signal processing apparatus for providing a coring threshold controllable in response to at least a portion of the digital signal to be cored. A digital coring circuit removes samples of digital input signals in a range determined by a digital threshold level signal. The threshold level signal is developed by a coring control device which makes use of a digital reference level. The device is used in processing digital television signals in a television receiver.

German Patent Application No. DE 39 19 817 A, entitled CIRCUIT FOR VIDEO SIGNAL DIGITAL APERTURE CORRECTION discloses a device wherein a digital aperture correction signal is derived from a video signal. The signal is modified by a circuit with adjustable, non-linear characteristics. The modified signal is added to the video signal. The non-linear characteristic provides aperture correction signal rise from zero to specified values according to correction signal values.

U.S. Pat. No. 4,270,026 entitled INTERPOLATOR APPARATUS FOR INCREASING THE WORD RATE OF A DIGITAL SIGNAL OF THE TYPE EMPLOYED IN A DIGITAL TELEPHONE SYSTEM, issued to Shenoi et al., and assigned to ITT Corporation, describes a device for increasing the sampling or word rate of a digital input signal. Conversely, U.S. Pat. No. 4,302,631, entitled DECIMATOR APPARATUS FOR DECREASING THE WORD RATE OF A DIGITAL SIGNAL OF THE TYPE EMPLOYED IN DIGITAL TELEPHONE SYSTEMS, issued to Shenoi et al., and also assigned to ITT Corporation, describes an apparatus to reduce the word rate and increase the word length of an out put digital signal of an analog to digital converter without conventional hardware multipliers. Such devices are commonly used in signal processing circuits for digitized video signals.

Another known possibility of generating a correction signal, in which a modified video signal has at least some of the above-mentioned characteristics, is to transmit the correction signal unchanged up to a predetermined amplitude, or with a predetermined attenuation or gain, by performing an amplitude-limiting action, and, if this predetermined amplitude is exceeded, to transmit a constant, maximum amplitude.

Particularly in digital systems, such a transfer function of the amplitude limiter can have a disadvantageous effect, since the correction signal being limited contains distortions in the form of harmonics which, depending on the modulation of the transfer function used, and on the ratio of desired signal frequency range to sampling frequency, may be folded back into the desired signal frequency range of the correction signal and produce interfering alias components there.

It is therefore an object of the present invention to provide an apparatus and method for generating a modified video signal wherein the interfering signals resulting from the amplitude-limiting action performed on the correction signal are minimized.

SUMMARY OF THE INVENTION

The apparatus and method according to the present invention use a transfer function for the amplitude limiter which can be exactly described by a rational integral function of the nth degree, $$y = a_0 + a_1{}^*x + a_2{}^*x^2 + a_3{}^*x^3 \ldots a_n{}^*x^n$$

with $1 < n < f_n/f_s$, where $f_n$ is the Nyquist frequency, $f_s$ is the maximum frequency of the frequency-band-limited video signal ($Y_{inf}$), x is the input to the amplitude limiter $a_0$ to $a_n$ are scale factors, and y is the output of the amplitude limiter.

Such transfer functions have the property that only a predeterminable, finite number of harmonics arise depending on the degree of the function. In systems with digital signal-processing circuitry, the degree of the function or the necessary sampling frequency can be chosen based on the predeterminable highest harmonic and the maximum frequency of the frequency-band-limited video signal so that no alias components will arise. Harmonics which fall into the frequency range between the maximum frequency of the frequency-band-limited video signal and the Nyquist frequency can be suppressed by suitable low-pass filtering following the amplitude-limiting action.

In a preferred embodiment of the apparatus according to the invention, the transfer function of the amplitude limiter can be described by $$y = a_0{}^*x - a_1{}^*x^n \quad (1 < n < f_n/f_s)$$

where x is the input to the amplitude limiter, $a_0$, $a_1$ are scale factors, and y is the output of the amplitude limiter. These transfer functions have the advantage that in the presence of a sinusoidal input signal, only n-1 harmonics arise, and that particularly with an even-numbered degree of the function, only even harmonics arise, which influence the image definition only negligibly.

In another preferred embodiment of the apparatus according to the invention, the amplitude limiter has a transfer function with a parabolic characteristic whose shape is determined by the formula $$y = a/b^2{}^*[2bx - (sgn\ x){}^*x^2] \quad |x| \leq 2b$$

where y is the output of the amplitude limiter, and x is the input to the amplitude limiter. Via the scale factor a, the maximum possible amplitude of the amplitude-limiter output is set. With the scale factor 2b, the operating range for the amplitude-limiter input is set so that the expected input signal will not exceed the maximum value resulting from the scale factor 2b. By varying the scale factor 2b, taking account of the above-specified limit, it is possible to set the amplitude of the input signal x at which the maximum value of the output signal y will be reached.

In the presence of a sinusoidal input signal, this parabolic characteristic produces only an interfering component with twice the frequency of such an input signal, thus permitting a sampling frequency for the digital signal processing which is low compared with the frequency-band-limited video signal. This harmonic, and the difference and sum-signal components produced in the presence of a different signal shape, can be separated by simple low-pass filters and are not folded back into the desired signal frequency band. Through this transfer function of the amplitude limiter, small and medium amplitudes of the frequency-band-limited video input signal can be increased or transmitted unchanged and large amplitudes can be reduced, with the amplification decreasing steadily from smaller toward larger amplitudes.

By scaling the frequency-band-limited video signal prior to the amplitude-limiting action, the desired modulation range of the transfer function can be set. By means of a noise suppressor preceding the amplitude limiter, small signal components can be suppressed completely or in part, thus preventing their increase by the transfer function of the subsequent amplitude limiter, which greatly increases small amplitudes and, thus, the undesired noise. Since positive and negative transitions in the video input signal have different effects on the image definition, provision can be made for a setting of the scaling which differs for positive and negative video input signals.

To determine the output signals of the amplitude limiter, predetermined values of the transfer characteristic are advantageously stored in a memory or memory area which is addressable with the value of the input signal. This very simple "table" permits a very fast and simple calculation of the output signals, with the resulting quantizing error having to be taken into account in proportioning the memory or memory area.

If the input signal is interpolated prior to the amplitude-limiting action, which interpolation is reversed after the amplitude-limiting action by a decimator acting as a low-pass filter, that portion of the digital signal processing circuitry which has to be designed in accordance with the invention to have a defined ratio between desired signal frequency range and sampling frequency to avoid alias components of the signals, can be limited to the section performing the amplitude-limiting action.

In another embodiment of the invention, the increased sampling frequency is avoided by splitting the frequency-band-limited video input signal, by interpolation before the amplitude limiter, into two signals which are respectively passed through two parallel amplitude limiters followed by two parallel decimators acting as low-pass filters, and are then recombined. In this embodiment, it is additional possible to divide the predetermined values of the transfer characteristic, which are stored in a memory to determine the output of the amplitude limiter, between two memories, one containing the even-numbered values and the other the odd-numbered ones. Through this division, the required storage space remains unchanged despite the use of two amplitude limiters.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The apparatus and method according to the present invention use a transfer function for the amplitude limiter which can be exactly described by a rational integral function of the nth degree, $$y = a_0 + a_1*x + a_2*x^2 + a_3*x^3 \ldots a_n*x^n$$

with $1 < n < f_n/f_s$, where $f_n$ is the Nyquist frequency, $f_s$ is the maximum frequency of the frequency-band-limited video signal ($Y_{inf}$), x is the input to the amplitude limiter, $a_0$ to $a_n$ are scale factors, and y is the output of the amplitude limiter.

Such transfer functions have the property that only a predeterminable, finite number of harmonics arise depending on the degree of the function. In systems with digital signal-processing circuitry, the degree of the function or the necessary sampling frequency can be chosen based on the predeterminable highest harmonic and the maximum frequency of the frequency-band-limited video signal so that no alias components will arise. Harmonics which fall into the frequency range between the maximum frequency of the frequency-band-limited video signal and the Nyquist frequency can be suppressed by suitable low-pass filtering following the amplitude-limiting action.

Figure 1:
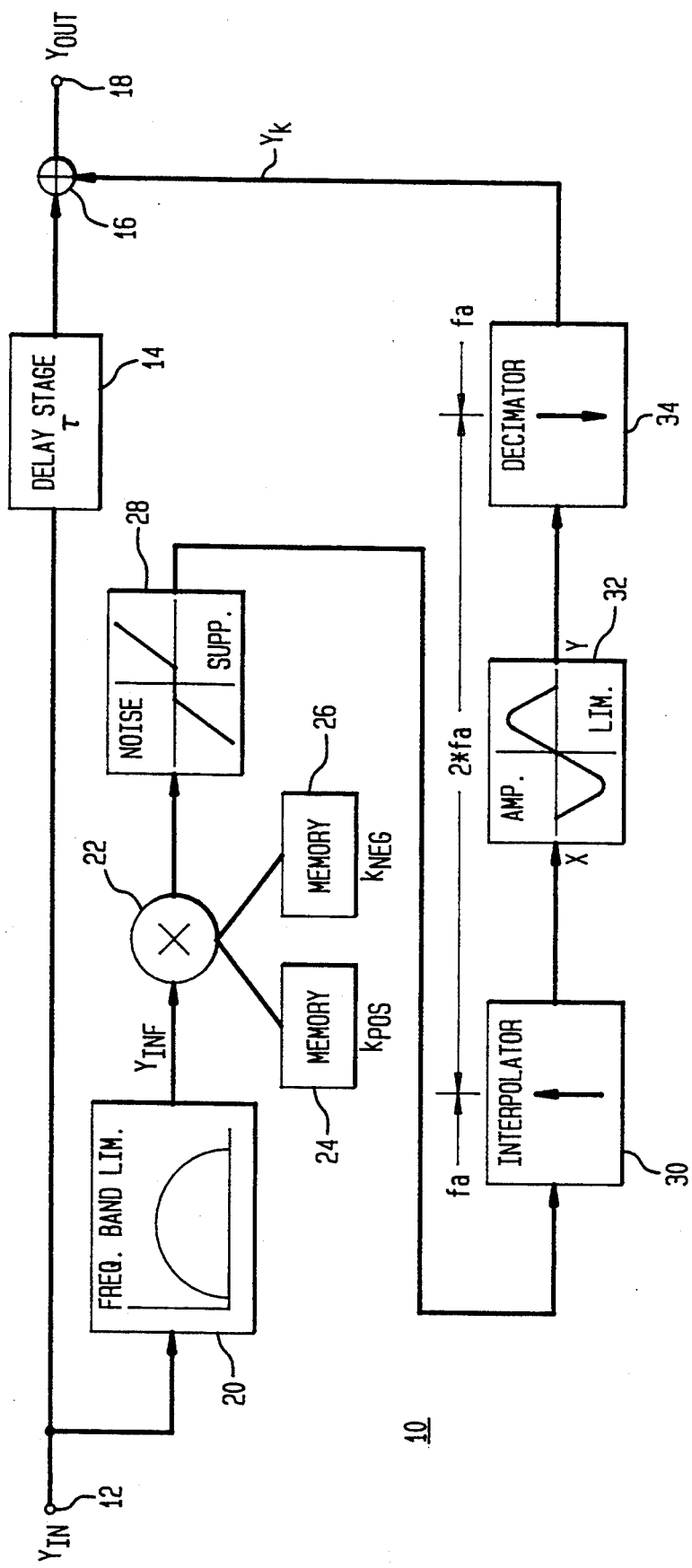
FIG. 1 is a block diagram of an arrangement using the novel method of generating a modified video signal.

FIG. 1 is a block diagram of an arrangement using the novel apparatus and method for generating a modified video signal. This block diagram can be regarded both as a block diagram of a circuit for carrying out the method and as a signal flow diagram of a digital signal processor which processes the video input signal by the novel method.

The digitized video input signal $Y_{in}$ appearing at an input 12 is applied through a delay stage 14 to one input of a summing stage 16, whose second input is supplied with a correction signal $Y_k$. The sum of the two signals is delivered as the modified video signal $Y_{out}$ to an output 18. The delay introduced by the delay stage 14 is equal to the time required to generate the correction signal $Y_k$ from the digitized video input signal $Y_{in}$ as described in the following manner.

To generate the correction signal $Y_k$, the digitized video input signal $Y_{in}$ is first passed through a frequency-band limiter 20, which can determine which frequency ranges of the video input signal $Y_{in}$ are to be changed.

The output $Y_{inf}$ of the frequency-band limiter 20 is fed to a scaling stage 22, with which the modulation range of the subsequent amplitude limiter can be set. By scaling the frequency-band-limited video signal prior to the amplitude-limiting action, the desired modulation range of the transfer function can be more easily set. This scaling stage uses for positive and negative input amplitudes the scale factors $k_{pos}$ and $k_{neg}$, which are stored in memories 24 and 26, respectively, and may have equal or different values.

In a subsequent noise suppressor 28, which has a gain of zero for amplitudes less than a predetermined amplitude and a constant gain for amplitudes greater than the predetermined amplitude, small signal components are completely suppressed, thus preventing their increase in the subsequent amplitude limiter, which greatly increases small amplitudes and thus, the undesired noise.

The noise suppressor 28 is followed by an interpolator 30 with the transfer function $H_{(z)}=(1+z^{-1})(1+1.25 z^{-1}+z^{-2})/6.5$ and the double sampling rate $2f_a$, which precedes an amplitude limiter 32. The interpolation is reversed by a decimator 34 with the transfer function $H_{(z)}=(1+1.25 z^{-1}+z^{-2})/3.25$, which follows the amplitude limiter 32.

In connection with this double sampling rate $2f_a$, the amplitude limiter 32 uses a transfer function with a parabolic characteristic whose shape is determined by the function $$y=a/b^{2}*[2bx-(sgn\ x)*x^2] \quad |x|\leq 2b$$

where y is the output of the amplitude limiter, and x is the input to the amplitude limiter and at which interfering signals with maximally twice the frequency of the desired signal can occur. Via the scale factor a, the maximum possible amplitude of the amplitude-limiter output is set. With the scale factor 2b, the operating range for the amplitude-limiter input is set so that the expected input signal will not exceed the maximum value resulting from the scale factor 2b. By varying the scale factor 2b, taking account of the above-specified limit, it is possible to set the amplitude of the input signal x at which the maximum value of the output signal y will be reached.

In the presence of a sinusoidal input signal, this parabolic characteristic produces only an interfering component with twice the frequency of such an input signal, thus permitting a sampling frequency for the digital signal processing which is low compared with the frequency-band-limited video signal. This harmonic, and the difference and sum-signal components produced in the presence of a different signal shape, can be separated by simple low-pass filters and are not folded back into the desired signal frequency band. Through this transfer function of the amplitude limiter, small and medium amplitudes of the frequency-band-limited video input signal can be increased or transmitted unchanged and large amplitudes can be reduced, with the amplification decreasing steadily from smaller toward larger amplitudes.

This "local" interpolation to the double sampling rate or double processing rate eliminates the need to increase the sampling rate or processing speed throughout the digital signal-processing circuit, and ensures that the interfering signals produced in the amplitude limiter 32 cannot result in alias components in the correction signal $Y_k$. The correction signal $Y_k$ provided at the output of the decimator 34, which also acts as a low-pass filter, thus has only a very small harmonic content and no alias components.

To determine the output signals of the amplitude limiter, predetermined values of the transfer characteristic are advantageously stored in a memory or memory area which is addressable with the value of the input signal. Thus, referencing a table of addresses permits a very fast and simple calculation of the output signals, with the resulting quantizing error having to be taken into account in proportioning the memory or memory area.

In another preferred embodiment of the apparatus according to the present invention, the transfer function of the amplitude limiter can be described by $$y=a_0*x-a_1*x^n (1<n<f_n/f_s)$$

where x is the input to the amplitude limiter, $a_0$, $a_1$ are scale factors, and y is the output of the amplitude limiter.

These transfer functions have the advantage that in the presence of a sinusoidal input signal, only n-1 harmonics arise, and that particularly with an even-numbered degree of the function, only even harmonics arise, which influence the image definition only negligibly.

In another embodiment of the invention, the increased sampling frequency required in the apparatus of FIG. 1 can be avoided by splitting the frequency-band-limited video input signal, by interpolation before the amplitude limiter, into two signals which are respectively passed through two parallel amplitude limiters followed by two parallel decimators acting as low-pass filters, and are then recombined.

Figure 2:
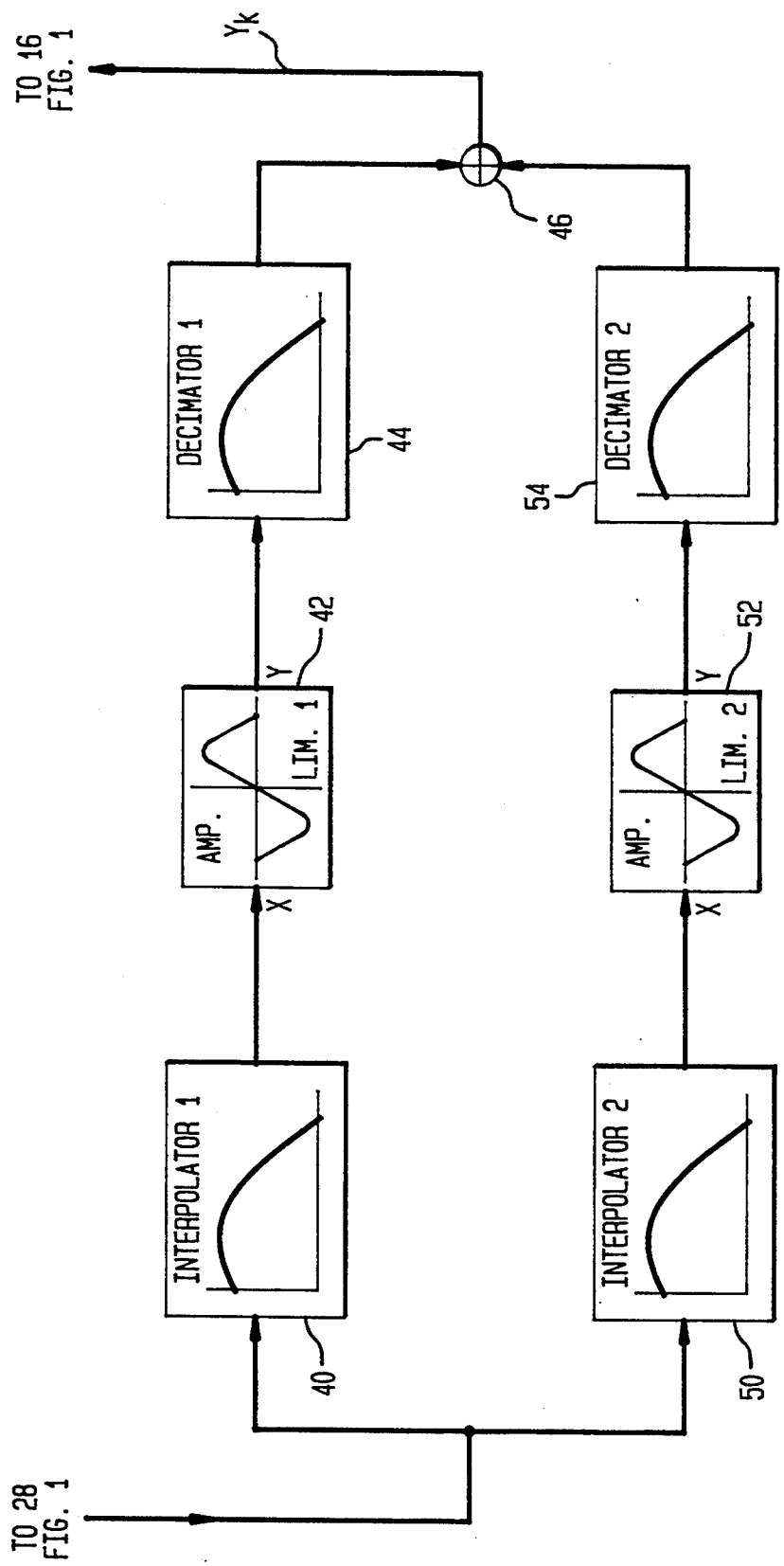
FIG. 2 is a block diagram of an arrangement with two amplitude limiters.

Referring to FIG. 2, the block diagram of that figure gives an example of a realization which avoids the increase of the sampling rate by the use of two parallel amplitude limiters. The interpolator 30 and decimator 34 can be converted into a parallel structure which operates only at the sampling rate $f_a$.

In this realization, the noise suppressor 28 is followed in the first branch by an interpolator 40 with the transfer function $H_{(z)}=(2.25+z^{-1})/3.25$, which has its output coupled to an amplitude limiter 42, and in the second, parallel branch by an interpolator 50 with the transfer function $H_{(z)}=(1+2.25\ z^{-1})/3.25$ and $H_{(z)}=(1-2.25\ z^{-1})/3.25$, respectively, which follow the parallel amplitude limiters 42 and 52. The outputs of the decimators 44 and 54 are combined by a summing stage 46, which provides the correction signal $Y_k$.

In this embodiment, it is additionally possible to divide the predetermined values of the transfer characteristic, which are stored in a memory to deter:mine the output of the amplitude limiter, between two memories, one containing the even-numbered values and the other the odd-numbered ones. Through this division, the required storage space remains unchanged despite the use of two amplitude limiters.

Figure 3:
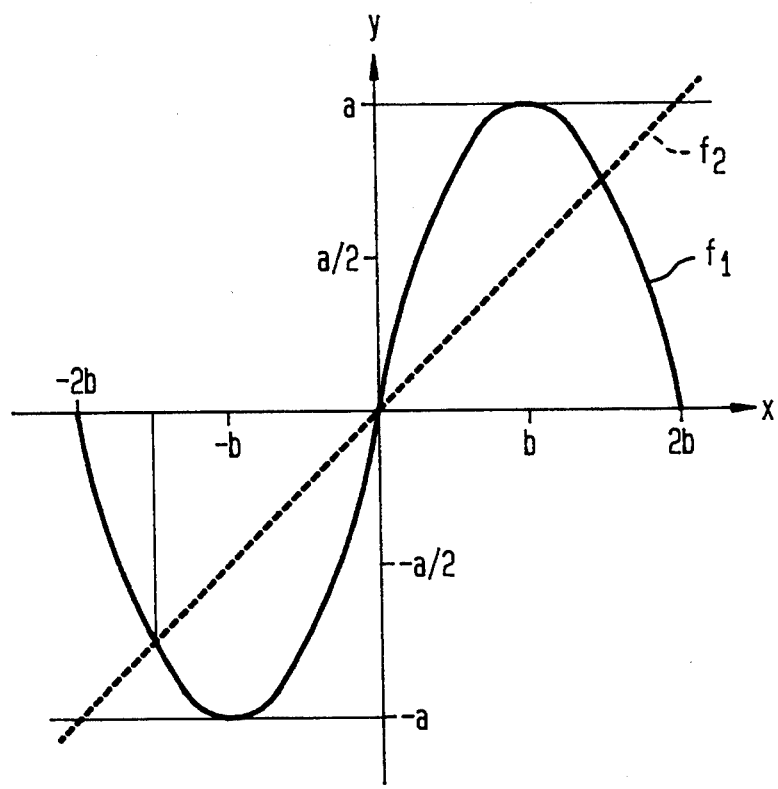
FIG. 3 shows an example of the shape of the transfer function of the amplitude limiter.

FIG. 3 shows by way of example the dependence f1 of the output signal y on the input signal x of the parabolic characteristic used in the amplitude limiter 32 (FIG. 1). To permit a comparison, a linear transfer characteristic f2 with the function $y=(a/2b)x$ has been drawn in. The scale factor a of the transfer function $$y=a/b^{2}*[2bx-(sgn\ x)*x^2] \quad |x|\leq 2b$$

determines the maximum output amplitude at half the maximum level of the input signal. The value of the scale factor 2b marks the zero crossings of the characteristic (at $x\neq 0$) up to which this transfer function can be used for amplitude-limiting purposes. If the input signal exceeds the value of 2b, an undesired sign reversal and an exponential increase of the amplitude of the output signal will take place. This transfer function is therefore chosen so that no input signals can occur which are larger than the largest input signal predetermined by the value of the scale factor 2b.

Both by the choice of a greater value for the scale factor 2b and by varying the scaling of the scaling stage 22 (FIG. 1), the modulation range of the characteristic f1 can be set, with the point of intersection of the characteristics f1 and f2 indicating up to which value of the input voltage x the characteristic of f1 has a greater gain than the linear function f2.

Figure 4:
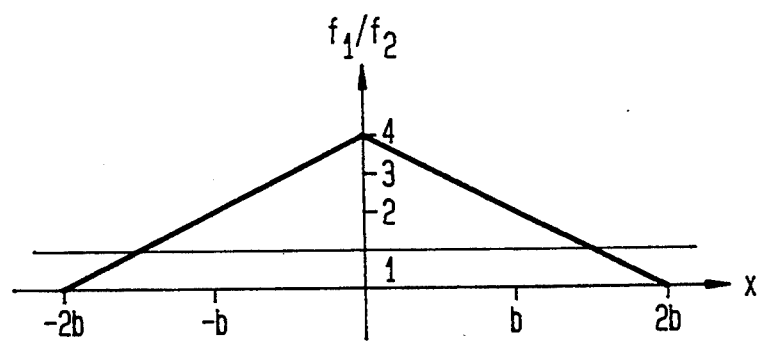
FIG. 4 shows the gain/attenuation characteristic of this transfer function.

Referring to FIG. 4, the gain and attenuation of the parabolic transfer function f1, normalized to the linear transfer function f2, is plotted against the input-signal amplitude.

$$\frac{f1}{f2} = \frac{\frac{a}{b^2} * [2bx - (sgnx) * x^2]}{\frac{a}{2b} * x} = 4 - \frac{2}{b} * (sgnx) x$$

Starting from a fourfold amplification for input signals around zero, the amplification decreases continuously to zero at the zero crossings $|x| = 2b$ of the transfer function f1 as the amplitude of the input signal increases.

It will be understood that the present invention signal generating apparatus and method described herein are merely exemplary and that a person skilled in the art may make many variations and modifications to the described embodiments utilizing functionally equivalent components to those described. As such, variations and modifications, including differing components and functionally equivalent circuit arrangements are intended to be within the scope of the invention as described in the appended claims.

What is claimed is:

1. In an apparatus for generating a modified video signal from a digitized video input signal, wherein a correction signal is derived from said digitized video input signal by at least a frequency-band limiter and an amplitude limiter, said digitized video input signal being delayed by the processing time of said correction signal to provide a delayed video input signal, said correction signal being combined with said delayed video input signal to produce said modified video signal, the improvement therewith comprising:
said amplitude limiter having a transfer function exhibiting a rational integral function.

2. The apparatus of claim 1, wherein said amplitude limiter has the following transfer function:

$$y = a_0 * x - a_1 * x^n$$

with $1 < n < f_n/f_s$, where x is the input to the amplitude limiter, $a_0$, $a_1$ are scale factors, and y is the output of the amplitude limiter.

3. The apparatus of claim 1, wherein said amplitude limiter has the following parabolic transfer function:

$$y = a/b^2 * [2bx - (sgn\ x) * x^2]$$

with $|x| \leq 2b$, where y is the output of the amplitude limiter, x is the input to the amplitude limiter and a and 2b are scale factors used to preset the maximum value of the output signal and the maximum value of the input signal, respectively.

4. The apparatus of claim 1, further including filter means coupled to the output of said amplitude limiter for suppressing unwanted harmonics of said correction signal.

5. The apparatus of claim 1, further including scaling means coupled to an input of said amplitude limiter, said scaling means operable to scale a frequency-band-limited video signal prior to input to said amplitude limiter, thereby setting a desired modulation range of said transfer function.

6. The apparatus of claim 5, wherein said scaling means includes different values of scaling, $k_{pos}$ and $k_{neg}$, depending on whether a positive or negative input signal is received.

7. The apparatus of claim 1, further including a noise suppressor coupled to an input of said amplitude limiter, said noise suppressor operable to suppress small signal components of a frequency-band-limited video signal prior to input to said amplitude limiter.

8. The apparatus of claim 1, including an interpolator coupled to an input of said amplitude limiter, said apparatus further including a decimator coupled to the output of said amplitude limiter for reversing an interpolation of said interpolator.

9. The apparatus of claim 8, wherein said interpolator is operable at a sampling rate which is at least double that of said frequency band limiter.

10. The apparatus of claim 1, further including memory means for storing predetermined output values of said transfer function, said memory means being addressable according to the value of an input signal.

11. The apparatus of claim 8, further including a second amplitude limiter coupled in series between a second interpolator and second decimator, said second interpolator, amplitude limiter and decimator coupled in parallel to a first combination thereof, thereby avoiding an increase in sampling rate frequency.

12. The apparatus of claim 11, further including memory means for storing predetermined output values of said transfer function, said memory means divided into two memories and being addressable according to the value of an input signal, a first memory containing even-numbered values and a second memory containing odd-numbered values.

13. The apparatus according to claim 1 wherein said apparatus is of the non-feedback type.

14. A method for generating a modified video signal from a digitized video input signal, wherein a correction signal is derived from said digitized video input signal by at least a frequency-band limiter and an amplitude limiter, said digitized video input signal being delayed by the processing time of said correction signal to provide a delayed video input signal, said correction signal and said delayed video input signal being combined to produce said modified video signal, the improvement therewith comprising the step of:
limiting said correction signal via said amplitude limiter having a transfer function exhibiting a rational integral function.

15. The method of claim 14, wherein said amplitude limiter has a transfer function that can be exactly described by the following rational integral function of the nth degree:

$$y = a_0 + a_1 * x + a_2 * x^2 + a_3 * x^3 \ldots a_n * x^n$$

with $1<n<f_n/f_s$, where $f_n$ is the Nyquist frequency, $f_s$ is the maximum frequency of the frequency-band-limited video signal, x is the input to the amplitude limiter, $a_0$ to $a_n$ are scale factors, and y is the output of the amplitude limiter.

16. The method of claim 14, wherein said amplitude limiter has the following transfer function:

$$y = a_0 * x - a_1 * x^n$$

with $1<n<f_n/f_n$, where x is the input to the amplitude limiter, $a_0$, $a_1$ are scale factors, and y is the output of the amplitude limiter.

17. The method of claim 14, wherein said amplitude limiter has the following parabolic transfer function:

$$y = a/b^2 * [2bx - (sgn\ x) * x^2]$$

with $|x| \leq 2b$, where y is the output of the amplitude limiter, x is the input to the amplitude limiter and a and 2b are scale factors used to preset the maximum value of the output signal and the maximum value of the input signal, respectively.

18. The method of claim 14, further including the step of suppressing unwanted harmonics of said correction signal by applying the output of said amplitude limiter to a low pass filter.

19. The method of claim 14, further including the step of scaling the frequency-band-limited video signal prior to input in said amplitude limiter, thereby setting a desired modulation range of said transfer function.

20. The method of claim 19, further including the step of applying different values of scaling, $k_{pos}$ and $k_{neg}$, depending on whether a positive or negative input signal is received.

21. The method of claim 14, further including the step of suppressing small signal components of the frequency-band-limited video signal prior to input in said amplitude limiter by applying said frequency-band-limited signal to a noise suppressor.

22. The method claim 14, further including the steps of interpolating the frequency-band-limited signal prior to application of said signal to said amplitude limiter and reversing said interpolation by means of decimation carried out in a decimator subsequent to said step of amplitude limiting.

23. The method of claim 22, further including the step of operating said interpolator at a sampling rate which is at least double that of said frequency band limiter.

24. The method of claim 14, further including the step of selecting predetermined output values of said transfer function stored in memory means in order to determine the output of said amplitude limiter, said memory means being addressable according to the value of an input signal.

25. The method of claim 22, further including applying said frequency band limited signal to a second amplitude limiter coupled in series between a second interpolator and second decimator, said second interpolator, amplitude limiter and decimator coupled in parallel to a first combination thereof, thereby avoiding an increase in sampling rate frequency.

26. The method of claim 25, further including the step of selecting predetermined output values of said transfer function stored in memory means in order to determine the output of the amplitude limiter, said memory means divided into two memories and being addressable according to the value of an input signal, a first memory containing even-numbered values and a second memory containing odd-numbered values.

27. In an apparatus for generating a modified video signal from a digitized video input signal, wherein a correction signal is derived from said digitized video input signal by at least a frequency-band limiter and an amplitude limiter, said digitized video input signal being delayed by the processing time of said correction signal to provide a delayed video input signal, said correction signal being combined with said delayed video input signal to produce said modified video signal, the improvement therewith comprising:

said amplitude limiter having a transfer function described by the following rational integral function of the nth degree:

$$y = a_0 + a_1 * x + a_2 * x^2 + a_3 * x^3 \ldots a_n * x^n$$

with $1<n<f_n/f_s$, where $f_n$ is the Nyqiust frequency, $f_s$ is the maximum frequency of the frequency-band-limited video signal, x is the input to the amplitude limiter, $a_0$ to $a_n$ are scale factors, and y is the output of the amplitude limiter.

* * * * *